April 11, 1939. P. B. CAMP 2,153,546
HAND BRAKE ACTUATING MECHANISM
Filed July 29, 1936 2 Sheets-Sheet 1
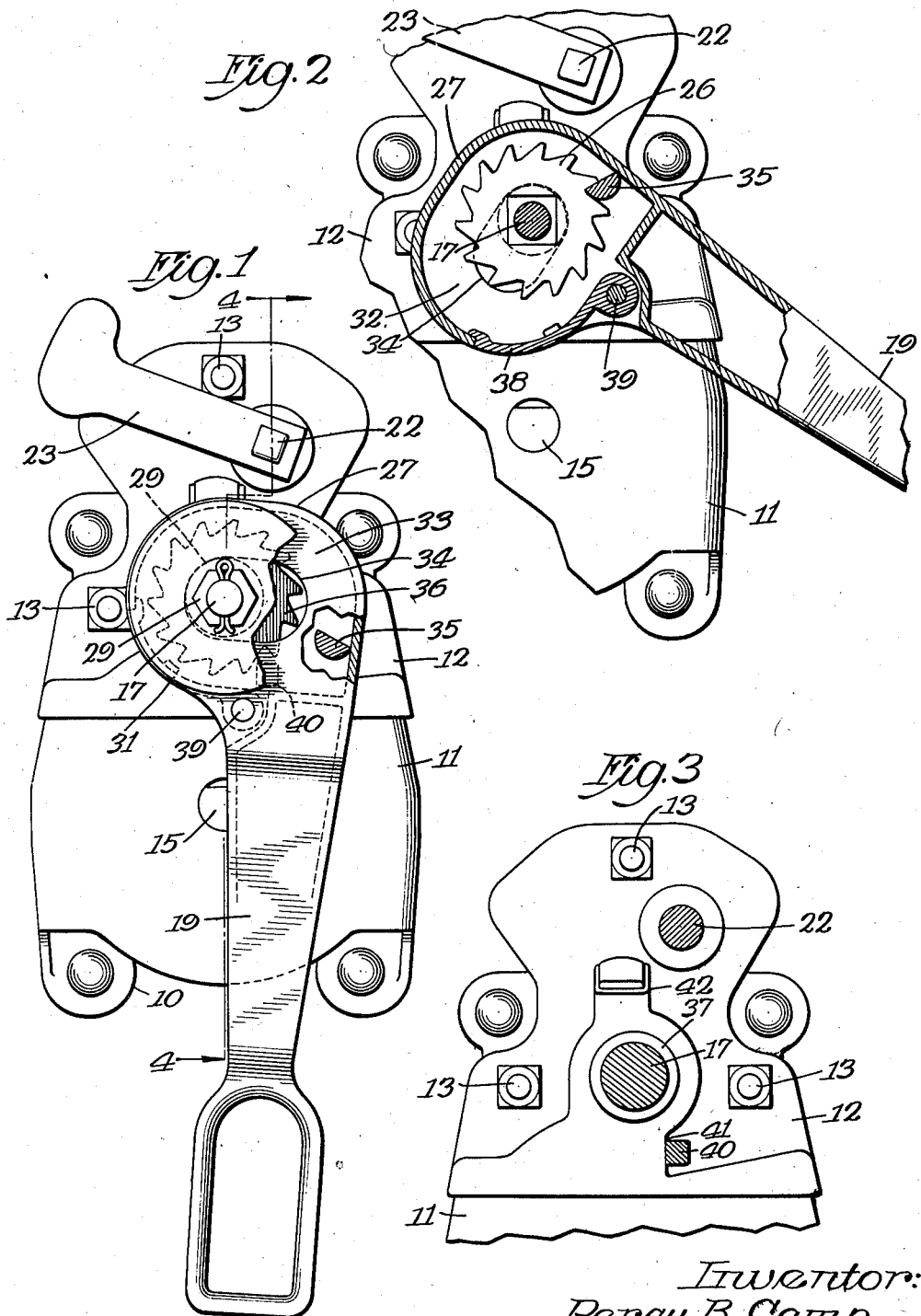
Inventor:
Percy B. Camp

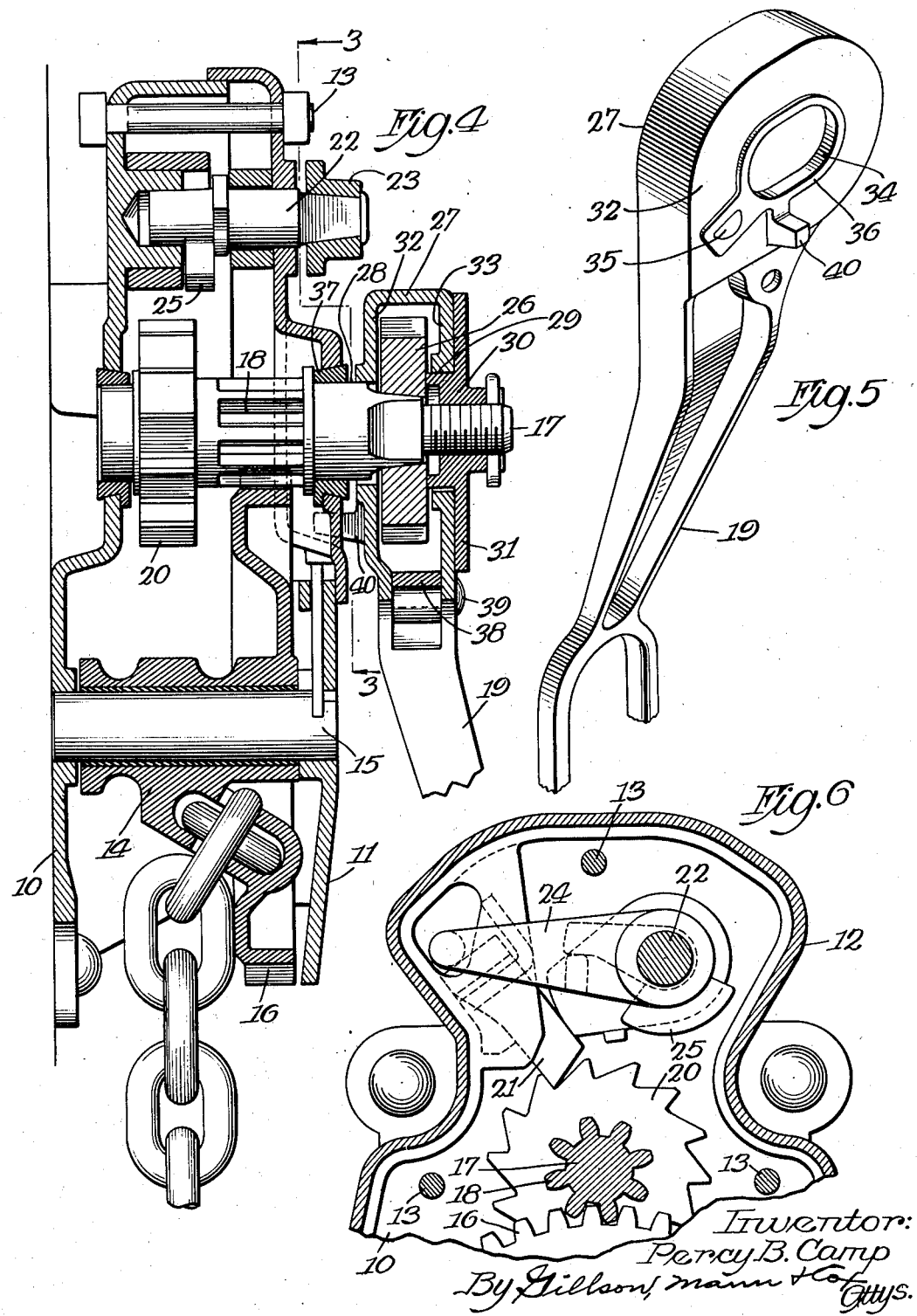

Patented Apr. 11, 1939

2,153,546

UNITED STATES PATENT OFFICE 2,153,546

HAND BRAKE ACTUATING MECHANISM

Percy B. Camp, Maywood, Ill., assignor to Universal Draft Gear Attachment Co., a corporation of Illinois Application July 29, 1936, Serial No. 93,217

12 Claims. (Cl. 74—505)

The invention relates to hand mechanism for operating the brakes of a railway car; its objects being to simplify the construction and operation of such mechanisms and for reducing the danger attending their operation.

The invention consists in the association, with a power shaft, of a ratchet wheel, a hand lever pivoted upon the shaft and having a shiftable bearing thereon, and carrying a pawl for cooperating with the ratchet wheel.

Other features of improvement will be pointed out in the following specification.

A preferred embodiment of the invention is hereinafter described, and is illustrated in the accompanying drawings, in which Fig. 1 is a front elevation of the housing enclosing portions of the actuating mechanism and of the operating lever, some parts being broken away to show internal construction and other parts being indicated in dotted lines;

Fig. 2 is a sectional detail from the same point of view as Fig. 1, the hand lever being in different position and shown in part in section;

Fig. 3 is a sectional detail on the line 3—3 of Fig. 4;

Fig. 4 is a sectional view on the line 4—4 of Fig. 1;

Fig. 5 is a view in perspective of the hand lever; and

Fig. 6 is a vertical transverse sectional view of the upper portion of the mechanism.

The actuating mechanism is inclosed within a housing comprising a wall plate 10, adapted to be riveted to the wall of a car, and a cover plate the lower portion 11 of which is preferably cast integral with the wall plate, its upper portion 12 being secured to the wall plate, as by means of bolts 13. The actuating mechanism comprises a drum 14, journaled within the lower portion of the housing on a shaft 15, secured in the wall plate 10 and the integral section 11 of the cover plate; a gear 16 mounted with the drum and, as shown, formed integrally therewith; a power shaft 17 journaled in the upper portion of the wall plate and in the removable section 12 of the cover plate, this shaft carrying a pinion 18 for driving the gear and which may be formed integrally with it; and a hand lever 19 for turning the shaft.

The mechanism for controlling the brake may be of any preferred construction, as shown comprising a ratchet wheel 20, fixed upon the shaft 17, a pawl 21 cooperating with this wheel and a shaft 22 journaled in the back wall 10 and cover plate section 12, upon which is mounted a control arm 23, and suitable crank arms and cams, as indicated at 24, 25, for holding and shifting the pawl. This control mechanism is not illustrated in detail inasmuch as it is not involved in the invention forming the subject-matter of this specification, and may be varied as found desirable.

A ratchet wheel 26 is fixed upon the outer end of the shaft 17, and is inclosed within a chambered head 27 of the hand lever 19, which is pivoted upon the shaft 17, as indicated at 28, and upon the hub 29 of a retaining nut 30 in threaded engagement with the outer end of this shaft and having a radial flange 31 overlapping the head 27 of the lever. The bearings of the head of the lever upon the body of the shaft and the hub 29 are formed, respectively, in the inner and outer walls 32, 33, of the head, and are elongated, as indicated at 34, this elongation being preferably, as shown, transverse to the longitudinal axis of the lever. The ends of this elongated bearing have the same curvature as the bearings 28, 29, with which they cooperate.

A pawl 35, preferably a hardened pin, is mounted within the chamber of the head 27, adjacent to one end of the elongated bearings in its walls, and is fixed in the inner and outer walls of the head, as by peening. A flange 36, formed on the inner face 32 of the head of the lever, surrounds the aperture 34 and widens the bearing on the shaft.

The lever 19 is preferably formed of an integral casting, except that its head is provided with a panel 38 to permit the entry of the ratchet wheel 26, the panel being preferably permanently attached to the head by means of an upset rivet 39, its removal being seldom necessary. The stroke of the lever 19 is preferably limited by means of a lug 40 projecting from the inner face of its head, and cooperating with stop shoulders 41, 42, formed on the cover plate 12 and located, respectively, below and above the bearings for the shaft 17.

The lever 19 normally hangs pendant from the shaft 17, as shown in Fig. 1, the major axes of its bearing slots being inclined slightly downward to the right, as indicated in Fig. 1, and the pawl 35 being thrown out of engagement with the ratchet 26 by the engagement of the lug 40 with the shoulder 41. As the lever is swung to the right and approaches the position of Fig. 2, its head is shifted laterally to the left by gravity, and the pawl 35 is brought into engagement with the ratchet 26. Continued upward movement of the lever turns the shaft 17 to wind up the brake chain upon the drum 14. Upward movement of the lever may be voluntarily arrested or stopped by engagement of its lug 40 with the shoulder 42. The shaft 17 will be held against retrogression by suitable pawl and ratchet mechanism, such as that shown in Fig. 6, and the lever may be swung downwardly, the pawl clicking over the ratchet wheel 26 and being fully withdrawn from engagement therewith as the lug 40 makes contact with the shoulder 41.

The actuating mechanism of this general type is usually mounted upon the end of a car, a platform being provided upon which the operator may stand, and inasmuch as but one hand is required for the setting up of the brake by means of a lever handle the safety of the operator is assured, as he has one hand free to support himself.

Though the improved actuating mechanism is illustrated as providing for the rotation of the shaft in counterclockwise direction, the mechanism may be adapted for turning of the shaft in the opposite direction by reversal of the various parts.

The described embodiment of the invention is highly efficient, but different modifications may be effected within its scope.

I claim as my invention—

1. In hand brake actuating mechanism, in combination, a winding drum, a power shaft in gear connection with the drum, a ratchet wheel mounted on the shaft, a normally pendant lever pivotally mounted on the shaft adjacent to the wheel, its bearing thereon being elongated substantially transversely to the portion of the lever in which it is located, a pawl carried by the lever and positioned to engage the wheel as the bearing of the lever on the shaft is shifted by gravity on the swinging of the lever about the shaft as a center.

2. In a hand brake actuating mechanism, in combination, a winding drum, a power shaft in gear connection with the drum, a ratchet wheel mounted on the shaft, a normally pendant lever pivotally mounted on the shaft adjacent to the wheel, its bearing thereon being elongated transversely of the lever, a ratchet-engaging pawl fixedly attached to the lever and positioned opposite to an end of the elongated bearing whereby the pawl is brought into engagement with the ratchet wheel by the transverse movement of the lever on the shaft.

3. In a hand brake actuating mechanism, in combination, a winding drum, a power shaft in gear connection with the drum, a ratchet wheel mounted on the shaft, a normally pendant lever pivotally mounted on the shaft adjacent to the wheel, its bearing thereon being elongated transversely of the lever, a pawl carried by the lever and positioned opposite to an end of the bearing whereby its engagement with the ratchet and its disengagement therefrom are effected by the shifting of the lever laterally to disengage the pawl from the wheel.

4. In brake actuating mechanism, in combination, a power shaft, a ratchet wheel fixed thereon, a hand lever having a transverse slot for pivotal engagement with the shaft, a pawl carried by the lever and located opposite the end of the slot for cooperating with the wheel and engageable therewith as the lever is shifted laterally by gravity, and means for automatically shifting the lever laterally on its return stroke to disengage the pawl from the wheel.

5. In brake actuating mechanism, in combination, a power shaft, a ratchet wheel fixed thereon, an oscillatable hand lever pivoted on the shaft its bearing thereon being elongated transversely of its axis, the pivoted end of the lever being chambered and inclosing the wheel, a fixed pawl within the head and located opposite an end of the bearing and substantially in line with the longitudinal axis thereof, the engagement of the pawl with the wheel being controlled by the shifting of the bearing and means for automatically shifting the lever on its return stroke to disengage the pawl.

6. In brake actuating mechanism, in combination, a power shaft, a ratchet wheel fixed thereon, an oscillatable hand lever pivoted on the shaft its bearing thereon being elongated transverse to the lever, the pivoted end of the lever being chambered and inclosing the wheel, a fixed pawl within the head and located opposite an end of the bearing, the engagement of the pawl with the wheel being controlled by the shifting of the bearing and fixed means for shifting the lever on its return stroke to dissengage the pawl.

7. In brake actuating mechanism, in combination, a power shaft, a ratchet wheel fixed thereon, a hand lever pivoted on the shaft its bearing thereon being elongated transverse to the lever, the pivoted end of the lever being chambered and inclosing the wheel, a fixed pawl within the head and located adjacent an end of the bearing, the engagement of the pawl with the wheel being controlled by the shifting of the bearing, a stop shoulder, and a lug carried by the lever and positioned to engage the shoulder as the lever approaches full retracted position for positively insuring disengagement of the pawl from the ratchet.

8. In hand brake actuating mechanism, in combination, a winding drum, a power shaft in gear connection with the drum, a ratchet wheel mounted on the shaft, a lever pivotally mounted on the shaft adjacent to the wheel, its bearing thereon being elongated substantially normal to the axis of the lever, a pawl carried by the lever and positioned adjacent an end of the elongated bearing to engage the wheel as the bearing of the lever on the shaft is shifted by gravity.

9. In a hand brake mechanism in combination, a power shaft for actuating the mechanism, a ratchet wheel fixed on the shaft, a normally pendant hand lever having laterally shiftable pivotal engagement with the shaft, and a pawl carried by the lever and positioned to engage the wheel as the lever moves laterally relatively to the shaft under the influence of gravity at the commencement of its upward stroke.

10. In brake actuating mechanism, in combination, a power shaft, a ratchet wheel thereon, an oscillatable lever pivotally mounted on the shaft as a fulcrum adjacent to the wheel, its bearing aperture being elongated approximately normal to the longitudinal axis of the lever, a pawl carried by the lever and positioned to engage the wheel as the lever moves by gravity laterally relative to the shaft, and a fixed abutment located below and adjacent to the shaft and engageable as a fulcrum by the lever on its return stroke.

11. In brake actuating mechanism, in combination, a power shaft, a ratchet wheel thereon, an oscillatable lever pivotally mounted on the shaft as a fulcrum adjacent to the wheel, its bearing aperture being elongated approximately normal to the longitudinal axis of the lever, a pawl carried by the lever and positioned to engage the wheel as the lever moves by gravity laterally relative to the shaft, and means for returning the slotted end of the lever to the position relative to the shaft from which it was shifted by gravity.

12. In brake actuating mechanism, in combination, a horizontally disposed power shaft, a ratchet wheel on the shaft, a normally pendant lever pivoted on the shaft and having a transversely elongated bearing aperture, a pawl fixed to the lever opposite the end of the aperture and engageable with the wheel as the lever moves laterally on the shaft by gravity, and a fixed stop engageable by the lever on its return to normal position as a fulcrum for disengaging the pawl from the wheel.

PERCY B. CAMP.